(12) United States Patent
Karakama et al.

(10) Patent No.: US 11,411,507 B2
(45) Date of Patent: Aug. 9, 2022

(54) BIDIRECTIONAL POWER CONVERTER

(71) Applicant: KABUSHIKI KAISHA YASKAWA DENKI, Kitakyushu (JP)

(72) Inventors: Hirotaka Karakama, Fukuoka (JP); Hidenori Hara, Fukuoka (JP); Masashiro Tanaka, Fukuoka (JP); Mitsugu Tajima, Fukuoka (JP); Yoichi Yano, Fukuoka (JP)

(*) Notice: Subject to any disclaimer, the term of this patent is extended or adjusted under 35 U.S.C. 154(b) by 0 days.

(21) Appl. No.: 17/241,073

(22) Filed: Apr. 27, 2021

(65) Prior Publication Data

US 2021/0336549 A1 Oct. 28, 2021

(30) Foreign Application Priority Data

Apr. 28, 2020 (JP) .............................. JP2020-079419

(51) Int. Cl.
*H02M 5/44* (2006.01)
*H02M 1/12* (2006.01)

(52) U.S. Cl.
CPC ............... *H02M 5/44* (2013.01); *H02M 1/12* (2013.01)

(58) Field of Classification Search
CPC ............ H02M 5/44; H02M 1/10; H02M 1/12; H02M 1/34; H02M 1/36
See application file for complete search history.

(56) References Cited

U.S. PATENT DOCUMENTS

| | | | | |
|---|---|---|---|---|
| 5,889,667 A | * | 3/1999 | Bernet | H02M 7/797 323/239 |
| 2009/0256419 A1 | | 10/2009 | Anghel et al. | |
| 2022/0069721 A1 | * | 3/2022 | Karakama | H02M 1/084 |
| 2022/0069724 A1 | * | 3/2022 | Karakama | H02M 5/2932 |

FOREIGN PATENT DOCUMENTS

| | | |
|---|---|---|
| EP | 3393033 | 10/2018 |
| JP | 2006-109582 | 4/2006 |
| JP | 2011-030312 | 2/2011 |
| JP | 2011-087378 | 4/2011 |

OTHER PUBLICATIONS

Extended Search Report in corresponding European Application No. 21168858.5, dated Sep. 3, 2021.

* cited by examiner

*Primary Examiner* — Adolf D Berhane
(74) *Attorney, Agent, or Firm* — SOEI Patent & Law Firm

(57) ABSTRACT

A power conversion apparatus includes: matrix converter circuitry to perform power conversion between a primary side electric power and a secondary side electric power; rectifier circuitry to convert the primary side electric power to charge a capacitor; and control circuitry to: set a changeover reference voltage at a first reference voltage when the primary side voltage magnitude is a first voltage magnitude and set the changeover reference voltage at a second reference voltage when the primary side voltage magnitude is a second voltage magnitude; and select, based on the changeover reference voltage and the terminal voltage, a connection state from: a first connection state in which the rectifier circuitry is connected to the capacitor by a first route including a current limit device; and a second connection state in which the rectifier circuitry is connected to the capacitor by a second route that bypasses the current limit device.

20 Claims, 10 Drawing Sheets

BIDIRECTIONAL POWER CONVERTER

CROSS-REFERENCE TO RELATED APPLICATION

This application is based upon and claims the benefit of priority from Japanese Patent Application No. 2020-79419, filed on Apr. 28, 2020, the entire contents of which are incorporated herein by reference.

BACKGROUND

Field

The present disclosure relates to a power conversion apparatus, a power conversion method, and a program.

Description of the Related Art

Japanese Unexamined Patent Application Publication No. 2011-30312 discloses a power conversion apparatus including main circuitry consisting of switching elements connected between each phase of an input power source and each phase of an output side, and snubber circuitry consisting of a rectifier component and a snubber capacitor common to each phase, the snubber circuitry being connected in parallel to the switching elements of the main circuitry and suppressing overvoltage when the switching elements are turned off.

SUMMARY

A power conversion apparatus according to an aspect of the present disclosure includes: matrix converter circuitry configured to perform bidirectional power conversion between a primary side electric power associated with a primary side voltage magnitude and a secondary side electric power; rectifier circuitry configured to convert the primary side electric power to charge a capacitor having a terminal voltage; and control circuitry configured to: set a changeover reference voltage at a first reference voltage when the primary side voltage magnitude is a first voltage magnitude and set the changeover reference voltage at a second reference voltage which is different from the first reference voltage when the primary side voltage magnitude is a second voltage magnitude which is different from the first voltage magnitude; and select, based on a comparison between the changeover reference voltage and the terminal voltage, a connection state of the bidirectional power conversion from: a first connection state in which the rectifier circuitry is connected to the capacitor by a first route including a current limit device; and a second connection state in which the rectifier circuitry is connected to the capacitor by a second route that bypasses the current limit device.

A power conversion method according to another aspect of the present disclosure includes: performing bidirectional power conversion between a primary side electric power associated with a primary side voltage magnitude and a secondary side electric power; converting, by a rectifier circuitry, the primary side electric power to charge a capacitor having a terminal voltage; setting a changeover reference voltage at a first reference voltage when the primary side voltage magnitude is a first voltage magnitude and set the changeover reference voltage at a second reference voltage which is different from the first reference voltage when the primary side voltage magnitude is a second voltage magnitude which is different from the first voltage magnitude; and selecting, based on a comparison between the changeover reference voltage and the terminal voltage, a connection state of the bidirectional power conversion from: a first connection state in which the rectifier circuitry is connected to the capacitor by a first route including a current limit device; and a second connection state in which the rectifier circuitry is connected to the capacitor by a second route that bypasses the current limit device.

DETAILED DESCRIPTION

In the following description, with reference to the drawings, the same reference numbers are assigned to the same components or to similar components having the same function, and overlapping description is omitted.

Power Conversion Apparatus

Figure 1:
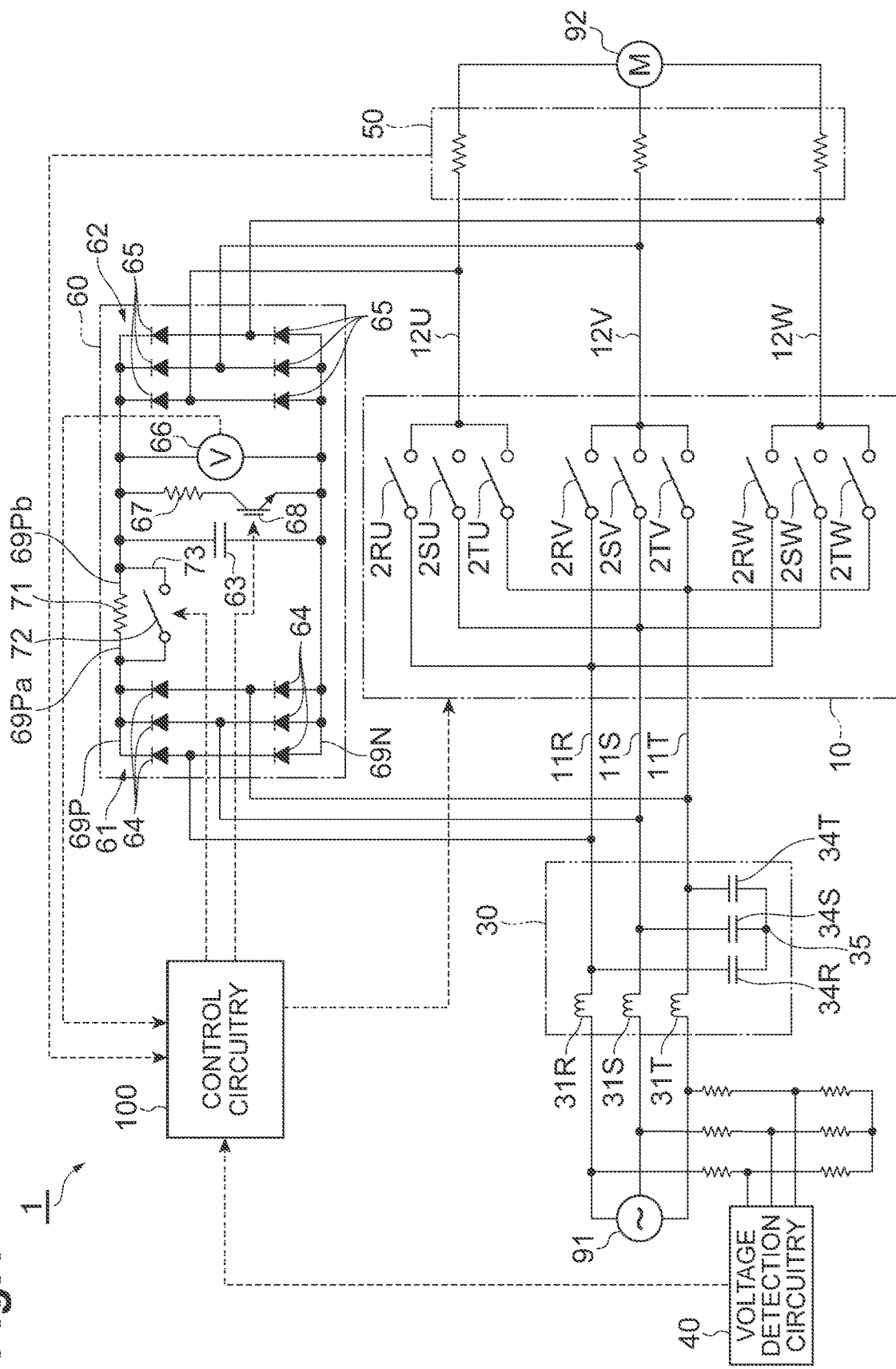
FIG. 1 is a schematic diagram illustrating an example schematic configuration of a power conversion apparatus.

A power conversion apparatus 1 illustrated in FIG. 1 is an apparatus for performing bidirectional power conversion between primary side electric power and secondary side electric power. For example, the power conversion apparatus 1 is configured to convert primary side electric power provided from the power source 91 into secondary side electric power and to provide the secondary side electric power to the electric motor 92. Also, the power conversion apparatus 1 is configured to convert secondary side electric power (regenerated power) generated by the electric motor 92 into primary side electric power and to provide the primary side electric power to the power source 91.

The primary side electric power and the secondary side electric power may be single phase alternating-current power or three phase alternating-current power. Also, the primary side electric power and the secondary side electric power may be direct-current power. Hereinafter, a case where both the primary side electric power and the secondary side electric power are three phase alternating-current power will be described. For example, the primary side electric power includes three phases of R phase, S phase, and T phase, and the secondary side electric power includes three phases of U phase, V phase, and W phase.

The power conversion apparatus 1 includes matrix converter circuitry 10, a filter 30, voltage detection circuitry 40, current sensors 50, voltage clamp circuitry 60, and control circuitry 100.

The matrix converter circuitry 10 has a plurality of switching elements and configured to perform bidirectional power conversion between the primary side electric power and the secondary side electric power without undergoing DC conversion. For example, the matrix converter circuitry 10 includes power lines 11R, 11S, and 11T on the primary side, power lines 12U, 12V, and 12W on the secondary side, and 9 sets of bidirectional switches 2RU, 2SU, 2TU, 2RV, 2SV, 2TV, 2RW, 2SW, and 2TW. The power line 11R is a power transmission line of the R phase, the power line 11S is a power transmission line of the S phase, and the power line 11T is a power transmission line of the T phase. The power line 12U is a power transmission line of the U phase. The power line 12V is a power transmission line of V phase. The power line 12W is a power transmission line of W phase.

Each of the bidirectional switches 2RU, 2SU, 2TU, 2RV, 2SV, 2TV, 2RW, 2SW, and 2TW is configure to change over three states: a state in which current flows from the primary side to the secondary side, a state in which current flows from the secondary side to the primary side, and a state in which current does not flow. The bidirectional switch 2RU is interposed between the power line 11R and the power line 12U, and is configured to change over a first on state in which current flows from the power line 11R to the power line 12U, a second on state in which current flows from the power line 12U to the power line 11R, and a bidirectional off state in which no current flows. The bidirectional switch 2SU is interposed between the power line 11S and the power line 12U, and is configured to change over a first on state in which current flows from the power line 11S to the power line 12U, a second on state in which current flows from the power line 12U to the power line 11S, and a bidirectional off state in which no current flows. The bidirectional switch 2TU is interposed between the power line 11T and the power line 12U, and is configured to change over a first on state in which current flows from the power line 11T to the power line 12U, a second on state in which current flows from the power line 12U to the power line 11T, and a bidirectional off state in which no current flows.

The bidirectional switch 2RV is interposed between the power line 11R and the power line 12V, and is configured to change over a first on state in which current flows from the power line 11R to the power line 12V, a second on state in which current flows from the power line 12V to the power line 11R, and a bidirectional off state in which no current flows. The bidirectional switch 2SV is interposed between the power line 11S and the power line 12V, and is configured to change over a first on state in which current flows from the power line 11S to the power line 12V, a second on state in which current flows from the power line 12V to the power line 11S, and a bidirectional off state in which no current flows. The bidirectional switch 2TV is interposed between the power line 11T and the power line 12V, and is configured to change over a first on state in which current flows from the power line 11T to the power line 12V, a second on state in which current flows from the power line 12V to the power line 11T, and a bidirectional off state in which no current flows.

The bidirectional switch 2RW is interposed between the power line 11R and the power line 12W, and is configured to change over a first on state in which current flows from the power line 11R to the power line 12W, a second on state in which current flows from the power line 12W to the power line 11R, and a bidirectional off state in which no current flows. The bidirectional switch 2SW is interposed between the power line 11S and the power line 12W, and is configured to change over a first on state in which current flows from the power line 11S to the power line 12W, a second on state in which current flows from the power line 12W to the power line 11S, and a bidirectional off state in which no current flows. The bidirectional switch 2TW is interposed between the power line 11T and the power line 12W, and is configured to change over a first on state in which current flows from the power line 11T to the power line 12W, a second on state in which current flows from the power line 12W to the power line 11T, and a bidirectional off state in which no current flows.

Figure 2:
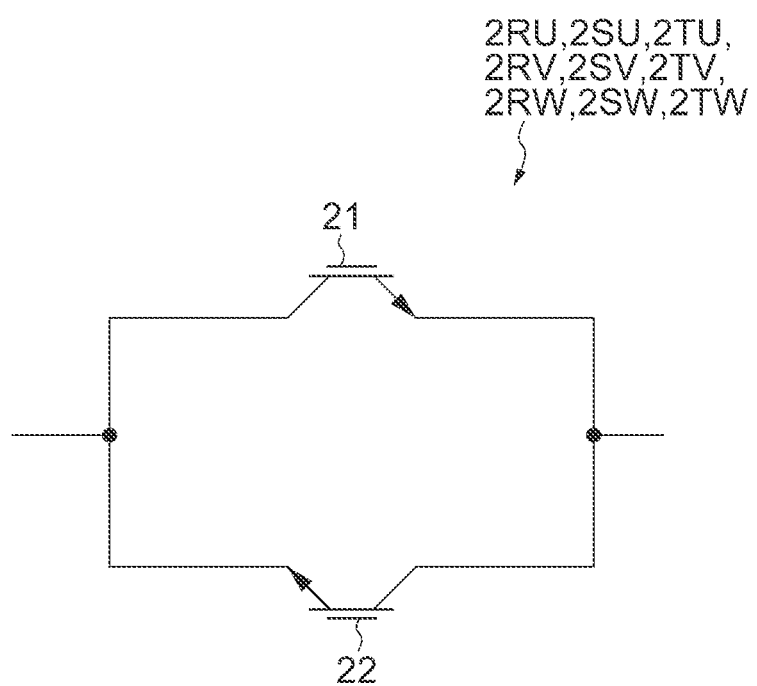
FIG. 2 is a schematic diagram showing an example of a bidirectional switch.

As illustrated in FIG. 2, the bidirectional switches 2RU, 2SU, 2TU, 2RV, 2SV, 2TV, 2RW, 2SW, and 2TW have two switches 21 and 22. In the on state, the switch 21 passes current from the primary side to the secondary side without passing current from the secondary side to the primary side. In the on state, the switch 22 passes current from the secondary side to the primary side without passing current from the primary side to the secondary side. The switches 21, 22 have a reverse blocking capability of maintaining off state even if voltage is applied in a direction opposite to a flow direction in the on state. The bidirectional switches 2RU, 2SU, 2TU, 2RV, 2SV, 2TV, 2RW, 2SW, and 2TW are in the first on state by turning on switch 21 and turning off switch 22, are in the second on state by turning off switch 21 and turning on switch 22, and are in the bidirectional off state by turning off switches 21 and 22. In FIG. 2, the bidirectional switches 2RU, 2SU, 2TU, 2RV, 2SV, 2TV, 2RW, 2SW, and 2TW may include diodes connected in series to the respective switches 21 and 22, if the switches have no reverse blocking capability. In this case, a connection point between the switch 21 and the diode and a connection point between the switch 22 and the diode may be connected to each other.

Returning to FIG. 1, the filter 30 reduces the voltage or current harmonic wave in the primary side electric power. For example, the filter 30 includes inductors 31R, 31S, and 31T and capacitors 34R, 34S, and 34T. Inductors 31R, 31S and 31T are provided to the power lines 11R, 11S and 11T, respectively. The capacitor 34R is provided between the power line 11R and the neutral point 35 on the secondary side of the inductor 31R (between the inductor 31R and the bidirectional switches 2RU, 2RV, and 2RW). The capacitor 34S is provided between the power line 11S and the neutral point 35 on the secondary side of the inductor 31S (between the inductor 31S and the bidirectional switches 2SU, 2SV, and 2SW). The capacitor 34T is provided between the power line 11T and the neutral point 35 on the secondary side of the inductor 31T (between the inductor 31T and the bidirectional switches 2TU, 2TV, and 2TW).

Since the filter 30 is provided between the power source 91 and the matrix converter circuitry 10, the matrix converter circuitry 10 is configured to convert the primary side electric power passed through the filter 30 into the secondary side electric power.

The voltage detection circuitry 40 (voltage sensor) detects the instantaneous value of the voltage in the primary side electric power. For example, the voltage detection circuitry 40 detects the instantaneous value of the phase voltage of each of the power lines 11R, 11S, and 11T. Hereinafter, the voltage in the primary side electric power is referred to as "primary side voltage". In addition, the instantaneous value of the primary side voltage is simply referred to as a "primary side voltage value", and a peak value (amplitude), an effective value, or the like representing the voltage magnitude in the entire region of half-cycle of the primary side voltage as one value is referred to as a "primary side voltage magnitude".

The current sensors 50 detect the instantaneous value of the current in the secondary side electric power (the current flowing between the matrix converter circuitry 10 and the electric motor 92). Hereinafter, for example, the current sensors 50 detect the instantaneous values of the currents of the power lines 12U, 12V, and 12W. Hereinafter, the current in the secondary side electric power is referred to as "secondary side current". The instantaneous value of the secondary side current is simply referred to as "secondary side current value".

The current sensors 50 may be configured to detect the secondary side current values of all phases of the power lines 12U, 12V, and 12W, or may be configured to detect the secondary side current value of any two phases of the power lines 12U, 12V, and 12W. As long as zero phase current does not occur, the total of the current values of U phase, V phase, and W phase is zero. Therefore, even when the secondary side current value of two phases is detected, information of the secondary side current value of all phases can be obtained.

The voltage clamp circuitry 60 is configured to generate direct-current power from at least a part of the primary side electric power of the power lines 11R, 11S, and 11T. The voltage clamp circuitry 60 may also generate direct-current power from a part of the secondary side electric power of the power lines 12U, 12V, 12W. The direct-current power generated by the voltage clamp circuitry 60 is used as a power source for the control circuitry 100. Further, the voltage clamp circuitry 60 is configured to discharge the direct-current power when the voltage in the generated direct-current power exceeds a predetermined level, thereby suppressing the overvoltage caused by turning on/off the bidirectional switches 2RU, 2SU, 2TU, 2RV, 2SV, 2TV, 2RW, 2SW, and 2TW. For example, the voltage clamp circuitry 60 includes rectifier circuitry 61 and 62, a capacitor 63, a direct-current voltage sensor 66, a resistor 67, a discharge switch 68, a resistor 71 (a surge protection device), and a changeover switch 72.

As described above, rectifier circuitry 61 is configured to convert at least a part of the primary side electric power of power lines 11R, 11S, and 11T into the direct-current power to charge capacitor 63. The control circuitry 100 is powered at least in part by the direct-current power generated by the rectifier circuitry 61. For example, the rectifier circuitry 61 is a diode bridge circuit having a plurality of diodes 64, and is connected to the positive electrode of the capacitor 63 via a positive line 69P and to the negative electrode of the capacitor 63 via a negative line 69N.

The rectifier circuitry 61 is connected to the power lines 11R, 11S, and 11T between the filter 30 and the matrix converter circuitry 10. Thus, the rectifier circuitry 61 is configured to receive the primary side electric power provided through the filter 30.

Rectifier circuitry 62 is configured to convert at least a part of the secondary side electric power of power lines 12U, 12V, 12W into the direct-current power to charge capacitor 63. For example, the rectifier circuitry 62 is a diode bridge circuit having a plurality of diodes 65, and is connected to the positive electrode of the capacitor 63 via a positive line 69P and to the negative electrode of the capacitor 63 via a negative line 69N. The direct-current voltage sensor 66 detects a direct-current voltage between the positive line 69P and the negative line 69N. This direct-current voltage corresponds to the terminal voltage of the capacitor 63.

The resistor 67 is provided between the positive line 69P and the negative line 69N. The discharge switch 68 is provided in series with the resistor 67 between the positive line 69P and the negative line 69N. The discharge switch 68 is configured to change over between a discharging state in which the positive line 69P and the negative line 69N are connected through the resistor 67 and a non-discharging state in which the resistor 67 is disconnected from the positive line 69P or the negative line 69N. For example, one end of the resistor 67 is connected to the positive line 69P, and the other end of the resistor 67 is connected to the negative line 69N via the discharge switch 68. One end of the resistor 67 may be connected to the positive line 69P via the discharge switch 68, and the other end of the resistor 67 may be connected to the negative line 69N.

The changeover switch 72 changes over an inserted state (a first connection state) in which the resistor 71 is inserted between the rectifier circuitry 61 and the capacitor 63 and a non-inserted state (a second connection state) in which the resistor 71 is not inserted between the rectifier circuitry 61 and the capacitor 63. For example, the resistor 71 is provided between the rectifier circuitry 61 and the capacitor 63 in the positive line 69P, and one end thereof is connected to a primary side portion 69Pa (connected to the rectifier circuitry 61) of the positive line 69P, and the other end thereof is connected to a second side portion 69Pb (connected to the capacitor 63) of the positive line 69P.

The changeover switch 72 is provided to a bypass line 73 that is provided in parallel with the resistor 71 between the rectifier circuitry 61 and the capacitor 63, and is configured to change over a state in which the bypass line 73 conducts and a state in which the bypass line 73 does not conduct. When the bypass line 73 is conductive, most of the current flowing between the rectifier circuitry 61 and the capacitor 63 flows through the bypass line 73, and the current flowing through the resistor 71 is very small, so that the non-inserted state substantially occurs.

As described above, the non-inserted state means a state in which most of the current flowing between the rectifier circuitry 61 and the capacitor 63 flows without passing through the resistor 71, and does not necessarily mean a state in which no current flows through the resistor 71. When the bypass line 73 is not conductive, most of the current flowing between the rectifier circuitry 61 and the capacitor 63 flows through the resistor 71, so that the inserted state is substantially obtained.

The control circuitry 100 is configured to control the matrix converter circuitry 10 to perform bidirectional power conversion between the primary side electric power and the secondary side electric power. Further, the control circuitry 100 is configured to change over the discharging state and the non-discharging state by the discharge switch 68 based on a predetermined discharge reference voltage and the terminal voltage of the capacitor 63.

Further, the control circuitry 100 is configured to change the changeover reference voltage based on the primary side voltage magnitude and to changeover the inserted state and the non-inserted state by the changeover switch 72 based on the changed changeover reference voltage and the terminal voltage of the capacitor 63.

Figure 3:
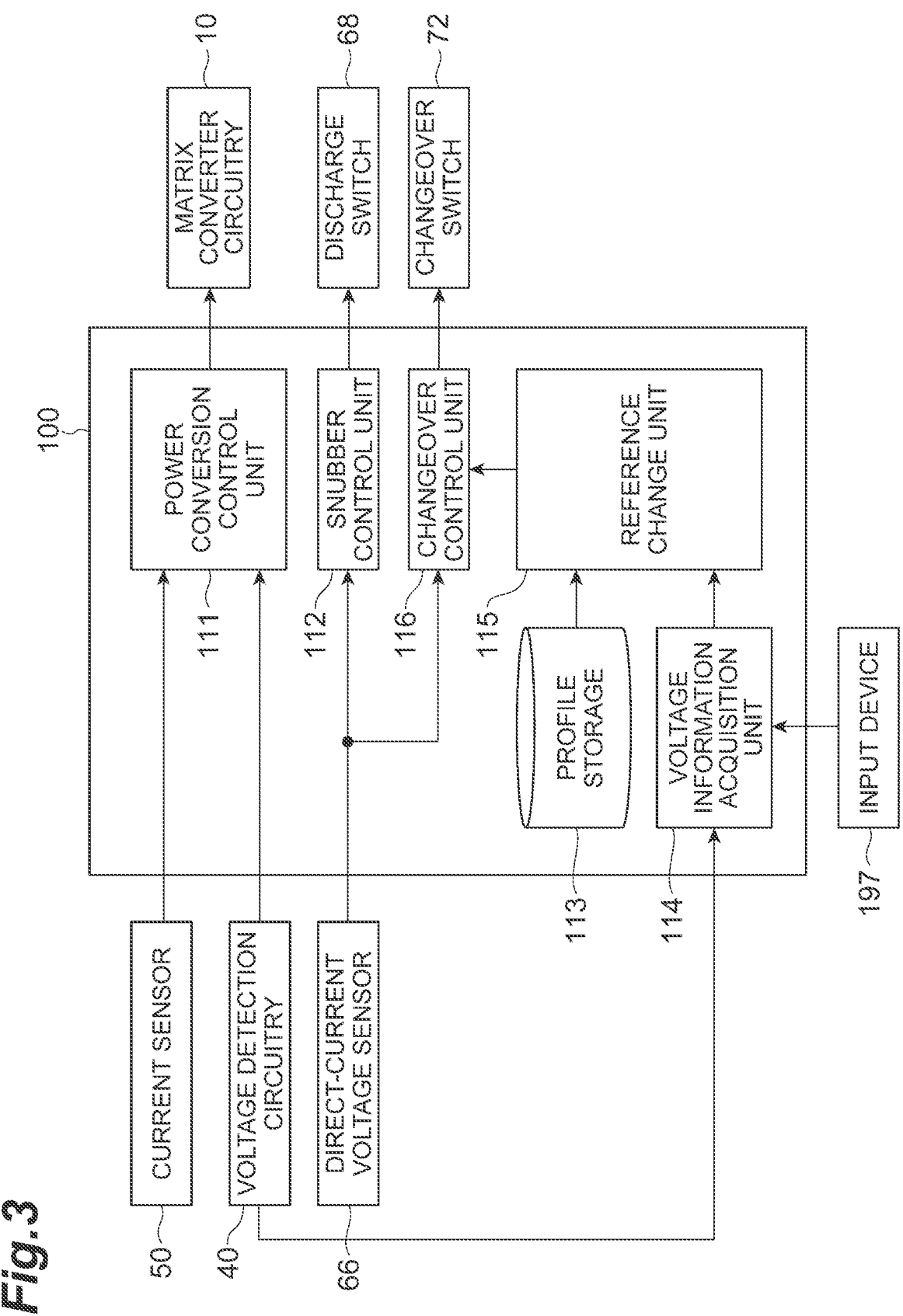
FIG. 3 is a block diagram illustrating an example functional configuration of the control circuitry.

For example, as illustrated in FIG. 3, the control circuitry 100 includes, as functional blocks, a power conversion control unit 111, a snubber control unit 112, a profile storage 113, a voltage information acquisition unit 114, a reference change unit 115, and a changeover control unit 116.

The power conversion control unit 111 is configured to control the matrix converter circuitry 10 to perform bidirectional power conversion between the primary side electric power and the secondary side electric power. For example, the power conversion control unit 111 is configured to generate a voltage command so that the operation of the electric motor 92 follows an operation command (for example, a speed command or a frequency command), and to control the matrix converter circuitry 10 so that the voltage of the secondary side electric power (hereinafter, referred to as a secondary side voltage) follows the voltage command.

For example, the power conversion control unit 111 generates the voltage command based on the operation command and the secondary side current value detected by the current sensor 50. In addition, the power conversion control unit 111 is configured to change over the on/off states of the bidirectional switches 2RU, 2SU, 2TU, 2RV, 2SV, 2TV, 2RW, 2SW, and 2TW in a predetermined carrier cycle so that the secondary side voltage follows the voltage command based on the voltage command and the primary side voltage value detected by the voltage detection circuitry 40.

The power conversion control unit 111 may acquire an operation command based on a user's input to the input device 197 described later, or may acquire an operation command from a host controller. Examples of the host controller include a programmable logic controller.

The snubber control unit 112 is configured to change over the discharging state and the non-discharging state by the discharge switch 68 based on a predetermined discharge reference voltage and the terminal voltage of the capacitor 63.

For example, the snubber control unit 112 is configured to change over the non-discharging state to the discharging state in response to determining that the terminal voltage of the capacitor 63 changes from a value smaller than a discharge reference voltage (hereinafter, referred to as a first discharge reference voltage) to a value larger than the first discharge reference voltage. The snubber control unit 112 may change over the discharging state to the non-discharging state in response to determining that the terminal voltage of the capacitor 63 changes from a value larger than a second discharge reference voltage to a value less than the second discharge reference voltage.

The second discharge reference voltage may be the same value as the first discharge reference voltage or may be different from the first discharge reference voltage. For example, the second discharge reference voltage may be smaller than the first discharge reference voltage. For example, the second discharge reference voltage may be a value obtained by subtracting a predetermined value from the first discharge reference voltage.

The profile storage 113 is configured to store a reference profile representing a relationship between the primary side voltage magnitude and the changeover reference voltage. The profile storage 113 may store a reference profile that continuously represents the relationship between the primary side voltage magnitude and the changeover reference voltage (for example, a function), or may store a reference profile that discretely represents the relationship between the primary side voltage magnitude and the changeover reference voltage (for example, a table).

The reference profile is predetermined such that the changeover reference voltage is smaller than a peak value of the primary side voltage. The reference profile is defined such that the direct current flowing in the rectifier circuitry 61 when the voltage applied to the capacitor 63 by the rectifier circuitry 61 increases in a step-like manner from the changeover reference voltage to the peak value of the primary side voltage is equal to or less than the allowable current of the rectifier circuitry 61.

Such a reference profile can be generated by circuit calculation, simulation, or the like based on a primary side circuit model including at least one parameter representing an electrical characteristic of the rectifier circuitry 61 and at least one parameter representing an electrical characteristic of the filter 30. Examples of a parameter that represents the electrical characteristic of the rectifier circuitry 61 include a voltage drop in the diode 64. Examples of the parameter representing the electrical characteristic of the filter 30 include magnitudes of the inductances of the inductors 31R, 31S, and 31T. The primary side circuit model may further include impedances of the power lines 11R, 11S, and 11T and the like in addition to the parameters of the rectifier circuitry 61 and the parameters of the filter 30. As an example, the reference profile is defined such that the changeover reference voltage increases as the peak value of the primary side voltage increases.

The voltage information acquisition unit 114 is configure to acquire and store voltage information indicating the primary side voltage magnitude. The voltage information may be a peak value of the primary side voltage or an effective value of the primary side voltage. The voltage information acquisition unit 114 may acquire voltage information based on a user's input to the input device 197 described later, or may acquire voltage information from the host controller.

The voltage information acquisition unit 114 may acquire voltage information based on the primary side voltage value detected by the voltage detection circuitry 40. For example, the voltage information acquisition unit 114 may evaluate the primary side voltage magnitude based on a plurality of primary side voltage values repeatedly detected by the voltage detection circuitry 40 over a predetermined length of time and acquire the voltage information based on the evaluation result of the primary side voltage magnitude. For example, the voltage information acquisition unit 114 is configured to calculate and store a peak value or an effective value of the primary side voltage based on a plurality of voltage values repeatedly detected by the voltage detection circuitry 40.

The reference change unit 115 is configured to change the changeover reference voltage based on the primary side voltage magnitude. The reference change unit 115 may set the changeover reference voltage to a first reference value when the primary side voltage magnitude is a first value, and may set the changeover reference voltage to a second reference value larger than the first reference value when the primary side voltage magnitude is a second value larger than the first value.

For example, the reference change unit 115 is configured to change the changeover reference voltage based on the voltage information acquired by the voltage information acquisition unit 114 and the reference profile stored in the profile storage 113. As an example, the reference change unit 115 is configured to extract from the reference profile the changeover reference voltage corresponding to the primary side voltage magnitude indicated by the voltage information acquired by the voltage information acquisition unit 114.

As described above, when the reference profile is defined such that the changeover reference voltage increases as the peak value of the primary side voltage increases, the reference change unit 115 increases the changeover reference voltage as the peak value of the primary side voltage increases. Therefore, when the peak value of the primary side voltage is the first value, the changeover reference voltage is set to be the first reference value, and when the peak value of the primary side voltage is the second value larger than the first value, the changeover reference voltage is set to be the second reference value larger than the first reference value.

When the profile storage 113 stores a discrete reference profile, the reference change unit 115 may calculate the changeover reference voltage corresponding to the peak value of the primary side voltage by interpolation (e.g., linear interpolation or polynomial interpolation) of the reference profile.

The changeover control unit 116 is configured to change over the inserted state and the non-inserted state by the changeover switch 72 based on the changeover reference voltage changed by the reference change unit 115 and the terminal voltage of the capacitor 63. For example, in response to determining that the terminal voltage of the capacitor 63 changes from a value larger than a changeover reference voltage (hereinafter, referred to as a first changeover reference voltage) to a value smaller than the first changeover reference voltage, the changeover control unit 116 changes over the non-inserted state to the inserted state by the changeover switch. When the terminal voltage of the capacitor 63 changes from a value smaller than a second changeover reference voltage to a value larger than the second changeover reference voltage, the changeover control unit 116 changes over the inserted state to the non-inserted state by the changeover switch 72.

The second changeover reference voltage may be the same value as the first changeover reference voltage or may be a value different from the first changeover reference voltage. For example, the second changeover reference voltage may be larger than the first changeover reference voltage. For example, the second changeover reference voltage may be a value obtained by adding a predetermined value to the first changeover reference voltage. In this case, the second changeover reference voltage is also changed by the reference change unit 115.

The configuration of the control circuitry 100 illustrated above is merely an example, and can be changed variously. For example, after the reference change unit 115 changes the changeover reference voltage, the voltage information acquisition unit 114 may repeatedly acquire the voltage information. In this case, the reference change unit 115 may evaluate a variation in the primary side voltage magnitude based on the voltage information repeatedly acquired by the voltage information acquisition unit 114, and change the changeover reference voltage again in response to determining that the evaluation result of the variation exceeds a predetermined level.

For example, the voltage information acquisition unit 114 may acquire the voltage information based on the voltage value detected by the voltage detection circuitry 40 every time a predetermined update period elapses after the reference change unit 115 changes the changeover reference voltage.

The reference change unit 115 may change the changeover reference voltage based on a parameter representing an electrical characteristic of the rectifier circuitry 61, a parameter representing an electrical characteristic of the filter 30, the primary side alternating voltage magnitude, and the allowable current of the rectifier circuitry, instead of based on the predetermined reference profile. For example, the reference change unit 115 may change the changeover reference voltage based on a primary side circuit model, the primary side alternating-current voltage magnitude, and the allowable current of the rectifier circuitry 61.

Figure 4:
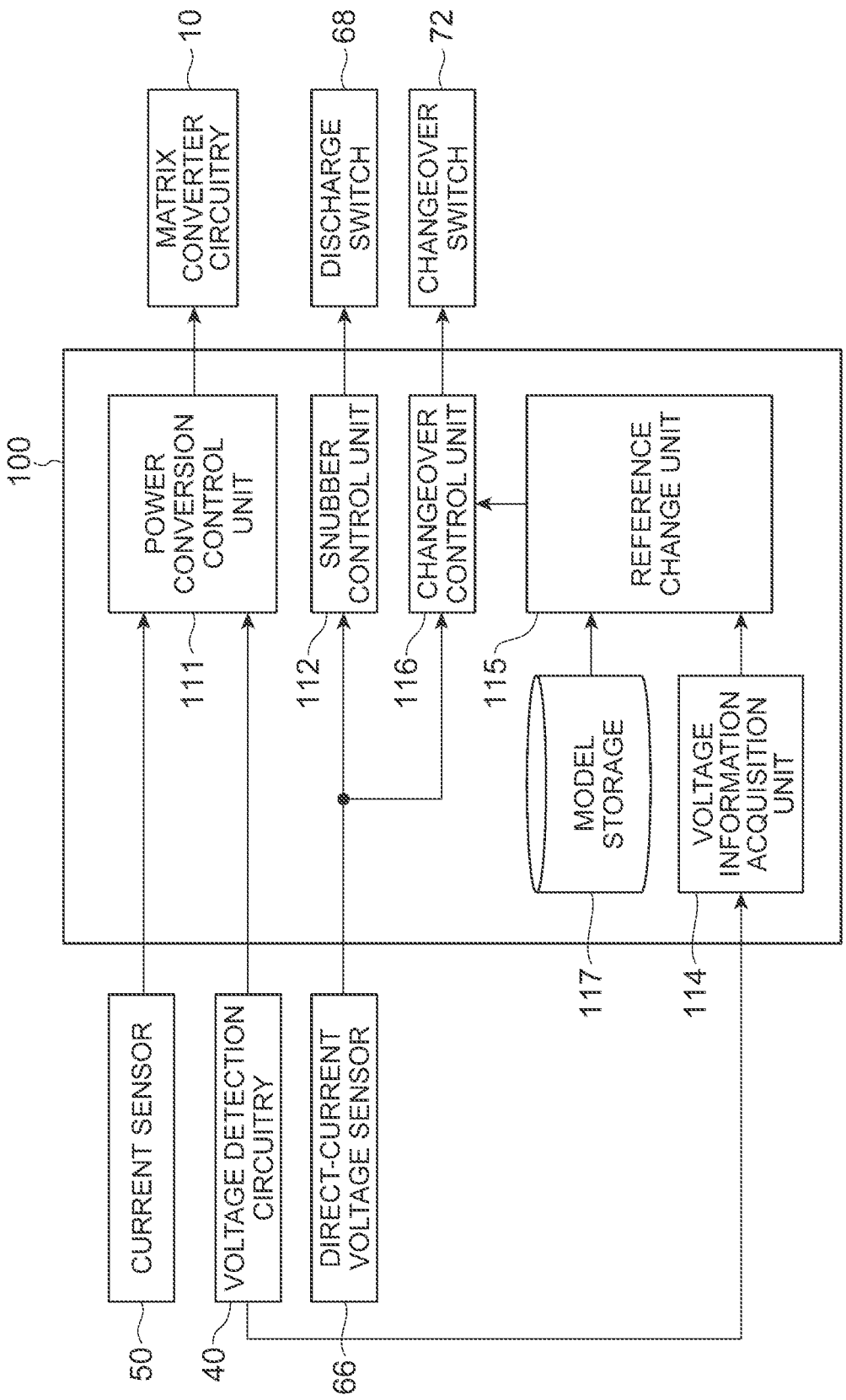
FIG. 4 is a block diagram illustrating a modification of the control circuitry.

For example, the reference change unit 115 is configured to change the changeover reference voltage based on the primary side circuit model, the primary side alternating-current voltage magnitude, and the allowable current of the rectifier circuitry 61 such that the direct current flowing to the rectifier circuitry 61 is less than or equal to the allowable current of the rectifier circuitry 61 when the voltage applied to the capacitor 63 by the rectifier circuitry 61 increases in a step-like manner from the changeover reference voltage to the peak value of the primary side voltage. In this case, as shown in FIG. 4, the control circuitry 100 may include a model storage 117 instead of the profile storage 113. The model storage 117 stores the primary side circuit model. The reference change unit 115 changes the changeover reference voltage by circuit calculation or simulation based on the primary side circuit model stored in the model storage 117.

Figure 5:
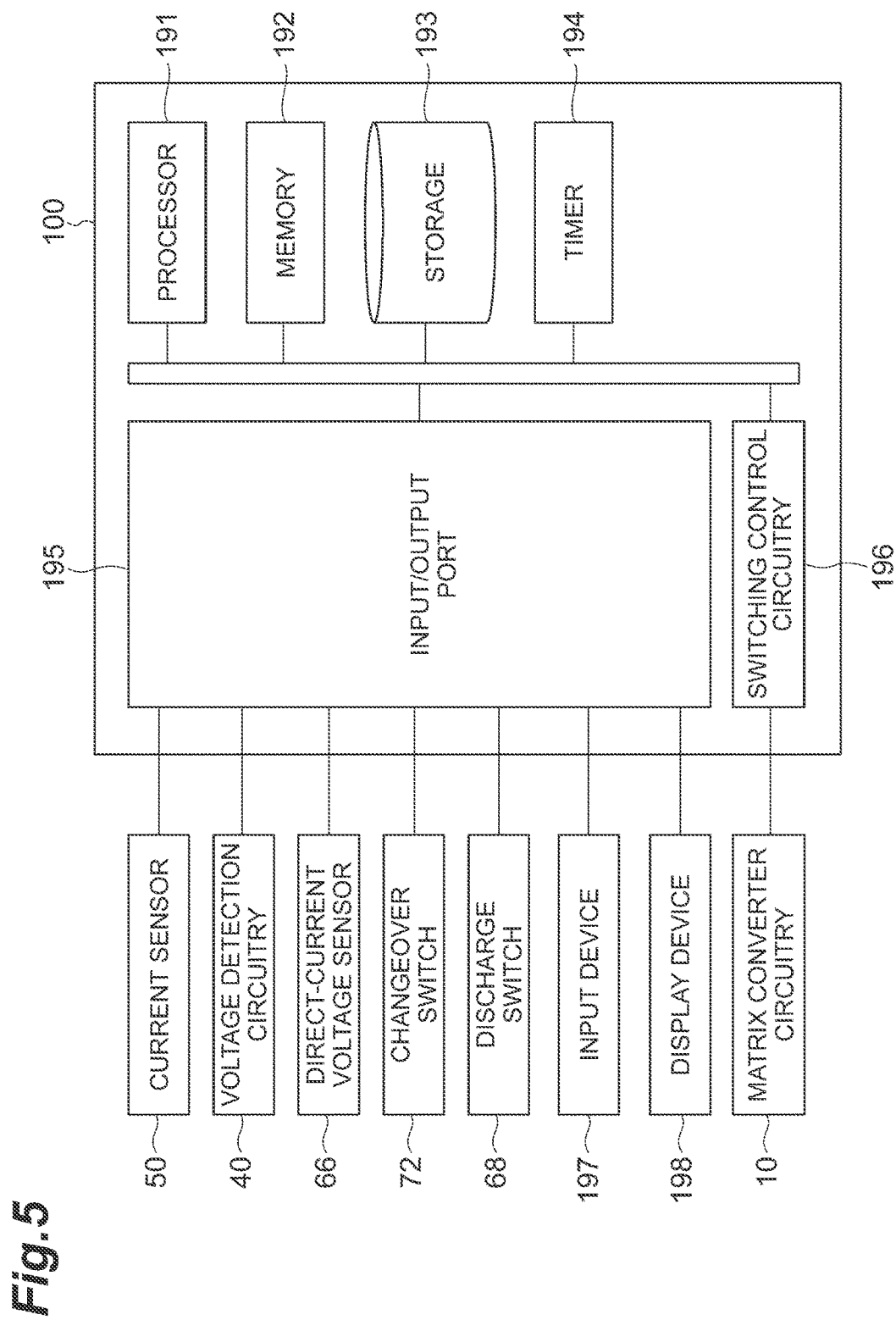
FIG. 5 is a block diagram illustrating an example hardware configuration of the control circuitry.

FIG. 5 is a block diagram illustrating a hardware configuration of the control circuitry 100. As shown in FIG. 5, control circuitry 100 includes one or more processors 191, memory 192, storage 193, timer 194, one or more input/output ports 195, and switching control circuitry 196. The storage 193 includes a computer-readable storage medium such as a nonvolatile semiconductor memory. The storage 193 stores a program for causing the control circuitry 100 to change the changeover reference voltage based on the voltage magnitude in the primary side electric power of the matrix converter circuitry, and to changeover an inserted state in which a resistor is inserted between the rectifier circuitry providing a part of the primary side electric power to the capacitor and the capacitor, and a non-inserted state in which no resistor is inserted between the rectifier circuitry and the capacitor by a changeover switch based on the changed changeover reference voltage and the terminal voltage of the capacitor. For example, the storage 193 stores a program for causing the control circuitry 100 to configure the above-described functional blocks.

The memory 192 temporarily stores a program loaded from the storage medium of the storage 193 and an operation result of the one or more processors 191. The one or more processors 191 execute the program in cooperation with the memory 192 to configure each functional block of the control circuitry 100. The timer 194 counts an elapsed time by counting clock pulses generated by a crystal oscillator or the like. The one or more input/output ports 195 input and output information to and from the current sensor 50, the voltage detection circuitry 40, the direct-current voltage sensor 66, the changeover switch 72, the discharge switch 68, the input device 197, and the display device 198 based on a command from the one or more processor 191. The switching control circuitry 196 outputs, to the matrix converter circuitry 10, a drive signal for changing over the bidirectional switches 2RU, 2SU, 2TU, 2RV, 2SV, 2TV, 2RW, 2SW, and 2TW on and off in accordance with an instruction from the one or more processor 191. The input device 197 acquires information input by the user. Examples of the input device 197 include a keypad. The display device 198 displays information to be notified to the user. Examples of the display device 198 include a liquid crystal monitor or an organic electroluminescence monitor. The input device 197 and the display device 198 may be incorporated in the power conversion apparatus 1, or may be incorporated in a device separate from the power conversion apparatus 1 and capable of communicating with the power conversion apparatus 1. The input device 197 and the display device 198 may be integrated as a so-called touch panel.

Power Conversion Sequence

Next, a power conversion sequence executed by the power conversion apparatus 1 will be described as an example of the power conversion method. This sequence includes performing bidirectional power conversion between the primary side electric power and the secondary side electric power by the matrix converter circuitry 10, providing a part of the primary side electric power to the capacitor 63 by the rectifier circuitry 61, changing the changeover reference voltage based on the primary side voltage magnitude, and changing over the inserted state and the non-inserted state by the changeover switch 72 based on the changed changeover reference voltage and the terminal voltage of the capacitor 63. Hereinafter, a control sequence executed by the control circuitry 100 to cause the power conversion apparatus 1 to execute the power conversion sequence will be described. The control sequence includes a control sequence of the matrix converter circuitry 10, a control sequence of the changeover switch 72, a control sequence of the discharge switch 68, and a changing sequence of the changeover reference voltage. Hereinafter, each sequence will be described in detail.

Control Sequence of Matrix Converter Circuitry

Figure 6:
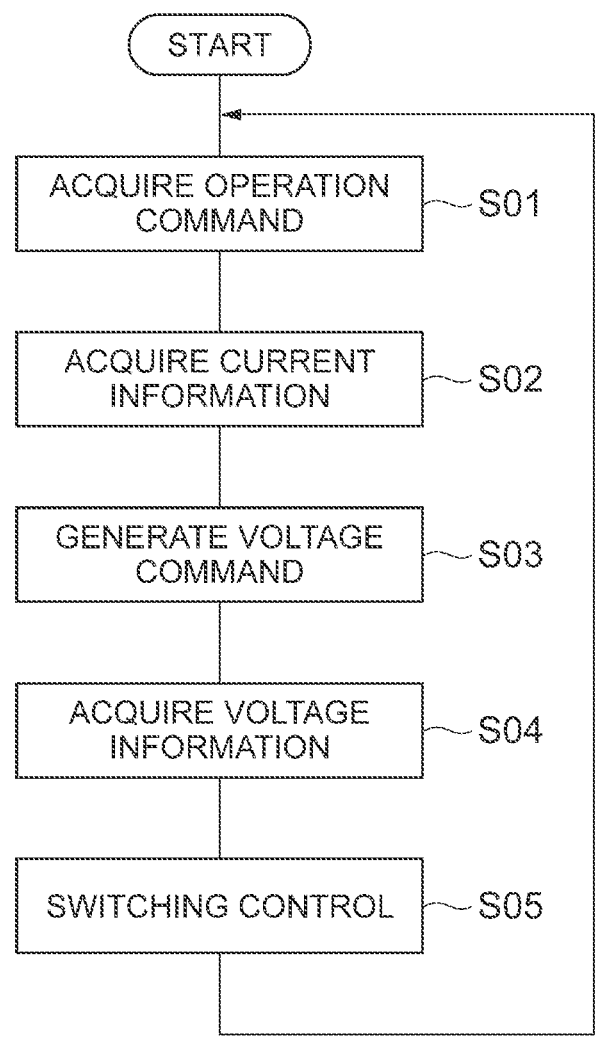
FIG. 6 is a flowchart illustrating an example power conversion sequence.

As shown in FIG. 6, the control circuitry 100 sequentially executes operations S01, S02, S03, S04, and S05. In operation S01, the power conversion control unit 111 acquires the operation command of the electric motor 92. In operation S02, the power conversion control unit 111 acquires the secondary side current value detected by the current sensor 50. In operation S03, the power conversion control unit 111 generates a voltage command based on the operation command acquired in operation S01 and the secondary side current value acquired in operation S02 so that the operation of the electric motor 92 follows the operation command. In operation S04, the power conversion control unit 111 acquires the primary side voltage value detected by the voltage detection circuitry 40. In operation S05, based on the voltage command generated in operation S03 and the primary side voltage value acquired in operation S04, the power conversion control unit 111 changes over the on/off states of the bidirectional switches 2RU, 2SU, 2TU, 2RV, 2SV, 2TV, 2RW, 2SW, and 2TW in a predetermined carrier cycle so that the secondary side voltage follows the voltage command.

The control circuitry 100 repeats the above procedure. Accordingly, the generation of the voltage command so that the operation of the electric motor 92 follows the operation command and the control of the matrix converter circuitry 10 so that the secondary side voltage follows the voltage command are repeated.

Control Sequence of Changeover Switch

The control sequence of the changeover switch is continuously executed in parallel with the control sequence of the matrix converter circuitry 10 described above. This sequence includes changing over the inserted state and the non-inserted state by the changeover switch 72 based on the changeover reference voltage and the terminal voltage of the capacitor 63.

Figure 7:
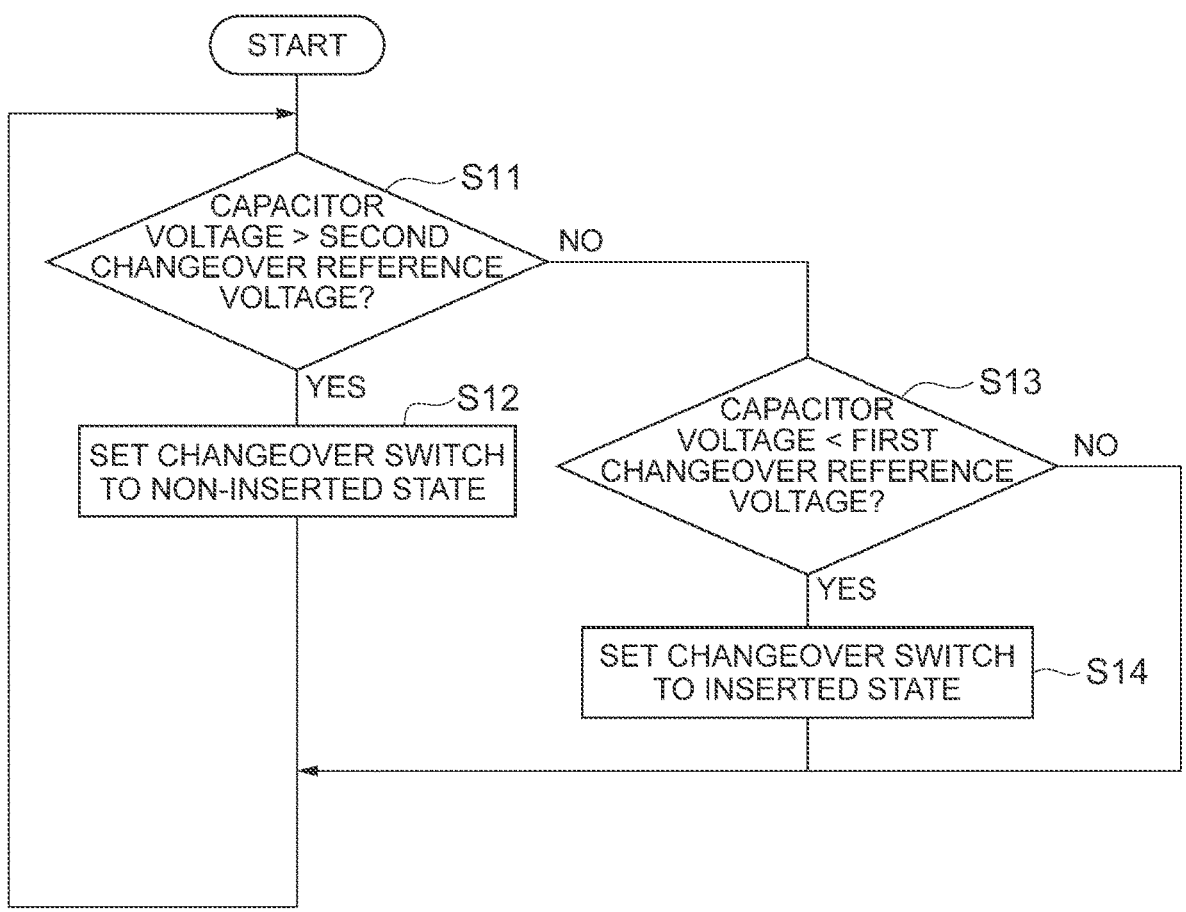
FIG. 7 is a flowchart illustrating an example control sequence of a changeover switch.

For example, as shown in FIG. 7, the control circuitry 100 first executes operation S11. In operation S11, the changeover control unit 116 checks whether the terminal voltage of the capacitor 63 exceeds the second changeover reference voltage. If it is determined in operation S11 that the terminal voltage of the capacitor 63 exceeds the second changeover reference voltage, the control circuitry 100 executes operation S12. In operation S12, the changeover control unit 116 sets the changeover switch 72 to the non-inserted state. For example, if the present status is the inserted state, the changeover control unit 116 changes over the inserted state to the non-inserted state by the changeover switch 72. If the present status is a non-inserted state, the changeover control unit 116 causes the changeover switch 72 to maintain the present status.

If it is determined in operation S11 that the terminal voltage of the capacitor 63 does not exceed the second changeover reference voltage, the control circuitry 100 executes operation S13. In operation S13, the changeover control unit 116 checks whether the terminal voltage of the capacitor 63 is lower than the first changeover reference voltage.

If it is determined in operation S13 that the terminal voltage of the capacitor 63 is lower than the first changeover reference voltage, the control circuitry 100 executes operation S14. In operation S14, the changeover control unit 116 sets the changeover switch 72 to the inserted state. For example, when the present status is the non-inserted state, the changeover control unit 116 changes over the non-inserted state to the inserted state by the changeover switch 72. If the present status is the inserted state, the changeover control unit 116 causes the changeover switch 72 to maintain the present status.

After executing operation S12 or S14, the control circuitry 100 returns the process to operation S11. If it is determined in operation S13 that the terminal voltage of the capacitor 63 is not lower than the first changeover reference voltage, the control circuitry 100 returns the process to operation S11 without executing operations S12 and S14.

According to the above sequence, when the terminal voltage of the capacitor 63 changes from a value larger than the first changeover reference voltage to a value smaller than the first changeover reference voltage, the changeover switch 72 changes over the non-inserted state to the inserted state. When the terminal voltage of the capacitor 63 changes from a value smaller than the second changeover reference voltage to a value larger than the second changeover reference voltage, the changeover switch 72 changes over the inserted state to the non-inserted state.

Control Sequence of Discharge Switch

The control sequence of the discharge switch is continuously executed in parallel with the control sequence of the matrix converter circuitry 10 described above. This sequence includes changing over the discharging state and the non-discharging state by the discharge switch 68 based on the discharge reference voltage and the terminal voltage of the capacitor 63.

Figure 8:
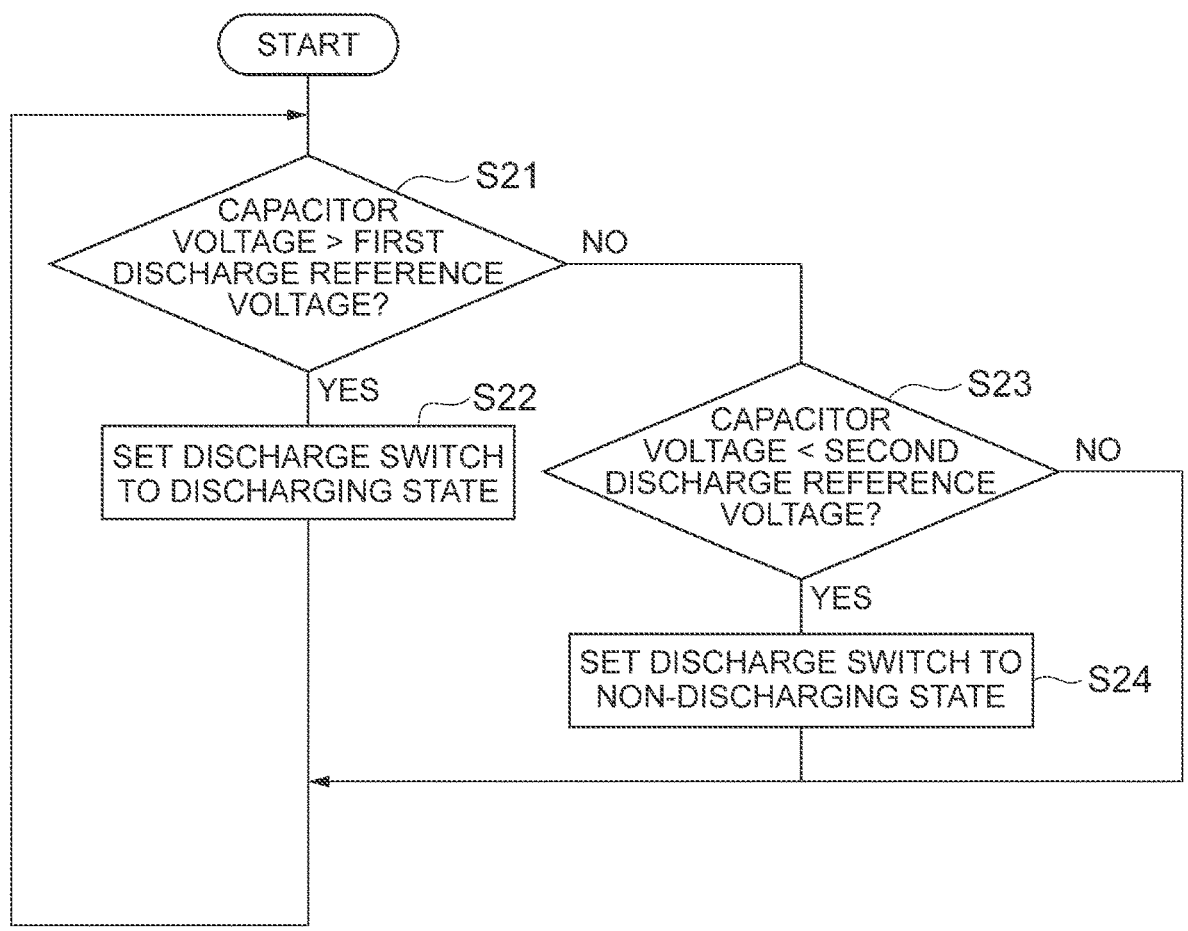
FIG. 8 is a flowchart illustrating an example control sequence of a discharge switch.

For example, as shown in FIG. 8, the control circuitry 100 first executes operation S21. In operation S21, the snubber control unit 112 checks whether the terminal voltage of the capacitor 63 exceeds the first discharge reference voltage.

If it is determined in operation S21 that the terminal voltage of the capacitor 63 exceeds the first discharge reference voltage, the control circuitry 100 executes operation S22. In operation S22, the snubber control unit 112 sets the discharge switch 68 to the discharging state. For example, if the present status is the non-discharging state, the snubber control unit 112 changes over the non-discharging state to the discharging state by the discharge switch 68. If present status is discharging state, the snubber control unit 112 causes the discharge switch 68 to maintain present status.

If it is determined in operation S21 that the terminal voltage of the capacitor 63 does not exceed the first discharge reference voltage, the control circuitry 100 executes operation S23. In operation S23, the snubber control unit 112 checks whether the terminal voltage of the capacitor 63 is lower than the second discharge reference voltage.

If it is determined in operation S23 that the terminal voltage of the capacitor 63 is lower than the second discharge reference voltage, the control circuitry 100 executes operation S24. In operation S24, the snubber control unit 112 sets the discharge switch 68 to the non-discharging state. For example, if the present status is the discharging state, the snubber control unit 112 changes over the discharging state to the non-discharging state by the discharge switch 68. If the present status is the non-discharging state, the snubber control unit 112 causes the discharge switch 68 to maintain the present status.

After executing operation S22 or S24, the control circuitry 100 returns the process to operation S21. If it is determined in operation S23 that the terminal voltage of the capacitor 63 is not lower than the second discharge reference voltage, the control circuitry 100 returns the process to operation S21 without executing operations S22 and S24.

According to the above sequence, when the terminal voltage of the capacitor 63 changes from a value smaller than the first discharge reference voltage to a value larger than the first discharge reference voltage, the discharge switch 68 changes over the non-discharging state to the discharging state. When the terminal voltage of the capacitor 63 changes from a value larger than the second discharge reference voltage to a value smaller than the second discharge reference voltage, the discharge switch 68 changes over the discharging state to the non-discharging state.

Changing Sequence of Changeover Reference Voltage

This sequence includes changing the changeover reference voltage based on the primary side voltage magnitude of the matrix converter circuitry 10. The control circuitry 100 may execute the changing sequence of the changeover reference voltage prior to the start of the control sequence of the matrix converter circuitry 10, or may execute the changing sequence of the changeover reference voltage in parallel with the control sequence of the matrix converter circuitry 10.

Figure 9:
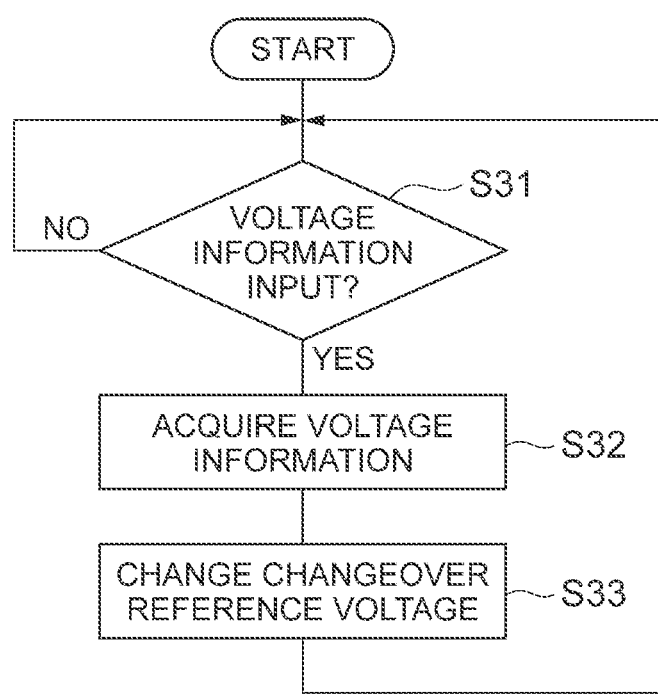
FIG. 9 is a flowchart illustrating an example changing sequence of a changeover reference voltage.

As shown in FIG. 9, the control circuitry 100 sequentially executes operations S31, S32, and S33. In operation S31, the voltage information acquisition unit 114 waits for input of voltage information to the input device 197 or input of voltage information from the host controller. In operation S32, the voltage information acquisition unit 114 acquires voltage information based on an input to the input device 197 or an input from the host controller. In operation S33, the reference change unit 115 changes the changeover reference voltage based on the voltage information acquired by the voltage information acquisition unit 114 and the reference profile stored in the profile storage 113. Thereafter, the control circuitry 100 returns the process to operation S31.

Thereafter, every time the voltage information is input to the input device 197 or the voltage information is input from the host controller, the voltage information is acquired and the changeover reference voltage based on the acquired voltage information is changed.

After the changing sequence of the changeover reference voltage is executed, the control sequence of the changeover switch is executed based on the changed changeover reference voltage. Before the changing sequence of the changeover reference voltage is executed, the control sequence of the changeover switch is executed based on the preset initial value of the changeover reference voltage.

Modification of Changing Sequence of Changeover Reference Voltage

As described above, the control circuitry 100 may be configured to change the changeover reference voltage based on the primary side voltage value detected by the voltage detection circuitry 40. Hereinafter, a changing sequence of the changeover reference voltage based on the primary side voltage value detected by the voltage detection circuitry 40 will be described. The control circuitry 100 executes the following sequence in parallel with the control sequence of the matrix converter circuitry 10 described above.

Figure 10:
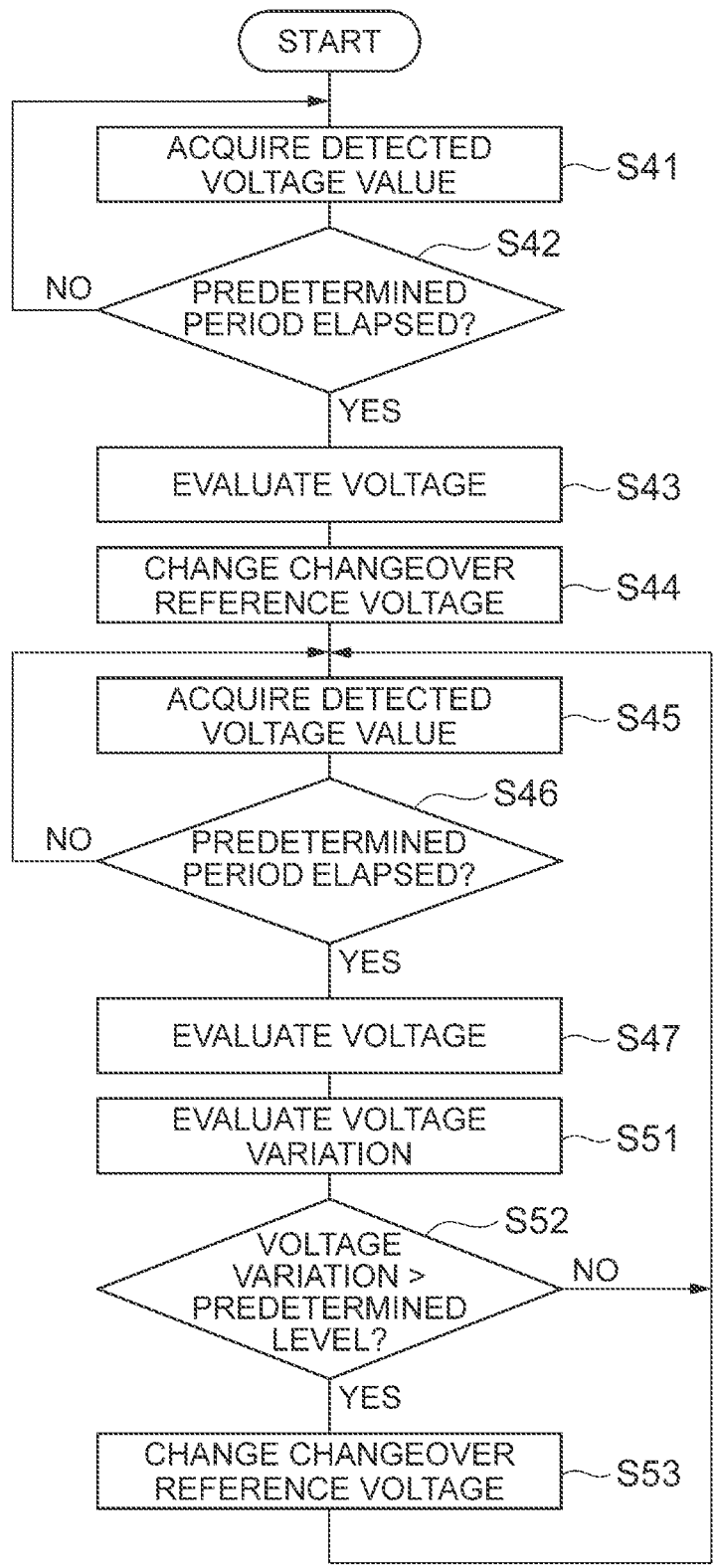
FIG. 10 is a flowchart illustrating a modification of the changing sequence of the changeover reference voltage.

As shown in FIG. 10, the control circuitry 100 first executes operations S41 and S42. In operation S41, the voltage information acquisition unit 114 acquires the primary side voltage value detected by the voltage detection circuitry 40. In operation S42, the voltage information acquisition unit 114 checks whether the sampling period of a predetermined length has elapsed.

If it is determined in operation S42 that the sampling period of the predetermined length has not elapsed, the control circuitry 100 returns the process to operation S41. Thereafter, the acquisition of the primary side voltage value is repeated until the sampling period elapses.

If it is determined in operation S42 that the sampling period of the predetermined length has elapsed, the control circuitry 100 executes operations S43, S44, S45, and S46. In operation S43, the voltage information acquisition unit 114 evaluates the primary side voltage magnitude based on the plurality of primary side voltage values repeatedly detected by the voltage detection circuitry 40 over the sampling period, and acquires the voltage information based on the evaluation result of the primary side voltage magnitude. In operation S44, the reference change unit 115 changes the changeover reference voltage based on the voltage information acquired by the voltage information acquisition unit 114 and the reference profile stored in the profile storage 113.

In operation S45, the voltage information acquisition unit 114 acquires the primary side voltage value detected by the voltage detection circuitry 40. In operation S46, the voltage information acquisition unit 114 checks whether the sampling period of the predetermined length has elapsed after the changeover reference voltage is changed.

If it is determined in operation S46 that the sampling period of the predetermined length has not elapsed, the control circuitry 100 returns the process to operation S45. Thereafter, the acquisition of the primary side voltage value is repeated until the sampling period elapses.

If it is determined in operation S46 that the sampling period of the predetermined length has elapsed, the control circuitry 100 executes operations S47, S51, and S52. In operation S47, the voltage information acquisition unit 114 evaluates the primary side voltage magnitude based on the plurality of primary side voltage values repeatedly detected by the voltage detection circuitry 40 over the sampling period, and acquires the voltage information based on the evaluation result of the primary side voltage magnitude. In operation S51, the reference change unit 115 evaluates a variation in the primary side voltage magnitude based on the primary side voltage magnitude indicated by the voltage information acquired by the voltage information acquisition unit 114 in operation S47 and the primary side voltage magnitude indicated by the voltage information acquired by the voltage information acquisition unit 114 in the past. In operation S52, the reference change unit 115 checks whether the evaluation result of the variation exceeds a predetermined level.

If it is determined in operation S52 that the evaluation result of the variation exceeds the predetermined level, the control circuitry 100 executes operation S53. In operation S53, the reference change unit 115 changes the changeover reference voltage again based on the latest voltage information acquired by the voltage information acquisition unit 114 and the reference profile stored in the profile storage 113. Thereafter, the control circuitry 100 returns the process to operation S45.

If it is determined in operation S52 that the estimation result of the variation does not exceed the predetermined level, the control circuitry 100 returns the process to operation S45 without executing operation S53. Thereafter, evaluating the variation of the primary side voltage magnitude, and changing the changeover reference voltage again based on the latest voltage information when the evaluation result of the variation exceeds a predetermined level, are repeated.

As described above, the power conversion apparatus 1 includes the matrix converter circuitry 10 configured to perform bidirectional power conversion between the primary side electric power and the secondary side electric power, the rectifier circuitry 61 configured to provide a part of the primary side electric power to the capacitor 63, the changeover switch 72 configured to change over the inserted state in which the resistor 71 is inserted between the rectifier circuitry 61 and the capacitor 63 and the non-inserted state in which the resistor 71 is not inserted between the rectifier circuitry 61 and the capacitor 63, the reference change unit 115 configured to change the changeover reference voltage based on the primary side voltage magnitude, and the changeover control unit 116 configured to change over the inserted state and the non-inserted state by the changeover switch 72 based on the changeover reference voltage changed by the reference change unit 115 and the terminal voltage of the capacitor 63.

Associated with matrix converter circuitry 10 are rectifier circuitry 61 for voltage clamp and capacitor 63. When the primary side voltage rises rapidly, an inrush current may occur in the rectifier circuitry 61.

The inrush current can be reduced by changing over the non-inserted state to the inserted state by the changeover switch 72. However, in an instantaneous power failure, the power source returns before changing over the non-inserted state to the inserted state, and the inrush current may occur in the non-inserted state. In order to reduce this inrush current, it is necessary to suppress the relative magnitude of the effective value of the primary side voltage with respect to the changeover reference voltage. Therefore, the power source voltage that can be applied to the matrix converter circuitry 10 is limited.

According to the power conversion apparatus 1, the changeover reference voltage is changed based on the primary side voltage magnitude, and the non-inserted state is switched to the inserted state based on the changed changeover reference voltage. This allows the changeover reference voltage to be adapted to the primary side voltage, thereby relaxing the above constraints due to inrush current of the rectifier circuitry 61. Therefore, the power conversion apparatus 1 may assist expanding the power source voltage range to which the matrix converter circuitry can be adapted.

The reference change unit 115 may set the changeover reference voltage to a first reference value when the primary side voltage magnitude is a first value, set the changeover reference voltage to a second reference value larger than the first reference value when the primary side voltage magnitude is a second value larger than the first value, and the changeover control unit 116 may switch the non-inserted state to the inserted state by the changeover switch 72 when the terminal voltage changes from a value larger than the changeover reference voltage to a value smaller than the first value. In this case, the changeover reference voltage is changed.

The power conversion apparatus 1 may further include a voltage information acquisition unit 114 configured to acquire voltage information indicating a primary side voltage magnitude, and a profile storage 113 configured to store a reference profile representing a relationship between the primary side voltage magnitude and the changeover reference voltage, and the reference change unit 115 may change the changeover reference voltage based on the voltage information acquired by the voltage information acquisition unit 114 and the reference profile. In this case, the changeover reference voltage may be changed.

The power conversion apparatus 1 may further include voltage detection circuitry 40 for detecting the primary side voltage value, and the voltage information acquisition unit 114 may acquire the voltage information based on the voltage value detected by the voltage detection circuitry 40. In this case, the changeover reference voltage can be changed based on the sensing result.

The voltage information acquisition unit 114 may evaluate the voltage magnitude of the primary side electric power based on a plurality of voltage values repeatedly detected by the voltage detection circuitry 40 over a predetermined length of time and acquire the voltage information based on the evaluation result of the voltage magnitude. In this case, the changeover reference voltage can be changed.

After the reference change unit 115 changes the changeover reference voltage, the voltage information acquisition unit 114 may repeatedly acquire the voltage information, and the reference change unit 115 may evaluate the variation of the primary side voltage magnitude based on the voltage information repeatedly acquired by the voltage information acquisition unit 114, and change the changeover reference voltage again when the evaluation result of the variation exceeds a predetermined level. In this case, a change in the primary side voltage after changing the changeover reference voltage may be flexibly adapted to.

The matrix converter circuitry 10 may convert the primary side electric power passing through the filter 30 into the secondary side electric power, the rectifier circuitry 61 may receive the primary side electric power passing through the filter 30, and the reference change unit 115 may change the changeover reference voltage based on at least one parameter representing the electrical characteristic of the rectifier circuitry 61, at least one parameter representing the electrical characteristic of the filter 30, the primary side voltage magnitude, and the allowable current of the rectifier circuitry 61. In this case, the changeover reference voltage can be changed more appropriately.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:
1. A power conversion apparatus comprising:
matrix converter circuitry configured to perform bidirectional power conversion between a primary side electric power associated with a primary side voltage magnitude and a secondary side electric power;

rectifier circuitry configured to convert the primary side electric power to charge a capacitor having a terminal voltage; and control circuitry configured to:
set a changeover reference voltage at a first reference voltage when the primary side voltage magnitude is a first voltage magnitude and set the changeover reference voltage at a second reference voltage which is different from the first reference voltage when the primary side voltage magnitude is a second voltage magnitude which is different from the first voltage magnitude; and select, based on a comparison between the changeover reference voltage and the terminal voltage, a connection state of the bidirectional power conversion from:
a first connection state in which the rectifier circuitry is connected to the capacitor by a first route including a current limit device; and
a second connection state in which the rectifier circuitry is connected to the capacitor by a second route that bypasses the current limit device.

2. The power conversion apparatus according to claim 1, wherein the control circuitry is further configured to change over from the second connection state to the first connection state in response to a decrease in the terminal voltage to a first value that is smaller than the changeover reference voltage.

3. The power conversion apparatus according to claim 2, wherein the control circuitry is further configured to change over from the first connection state to the second connection state in response to an increase in the terminal voltage to a second value that is larger than the changeover reference voltage.

4. The power conversion apparatus according to claim 1, wherein the second voltage magnitude is higher than the first voltage magnitude, and the second reference voltage is higher than the first reference voltage.

5. The power conversion apparatus according to claim 1, wherein the changeover reference voltage comprises a lower changeover threshold and an upper changeover threshold that is larger than the lower changeover threshold, and wherein the control circuitry is further configured to:
change over from the second connection state to the first connection state based on a comparison between the terminal voltage and the lower changeover threshold, and in response to determining that the terminal voltage decreases to a first value that is smaller than the lower changeover threshold; and
change over from the first connection state to the second connection state based on a comparison between the terminal voltage and the upper changeover threshold, and in response to determining that the terminal voltage increases to a second value that is larger than the upper changeover threshold.

6. The power conversion apparatus according to claim 5, wherein the first reference voltage includes a first lower threshold and a first upper threshold that is higher than the first lower threshold,
wherein the second reference voltage includes a second lower threshold and a second upper threshold that is higher than the second lower threshold, and
wherein the second voltage magnitude is higher than the first voltage magnitude, the second lower threshold is higher than the first lower threshold, and the second upper threshold is higher than the first upper threshold.

7. The power conversion apparatus according to claim 1, wherein the control circuitry is further configured to:
acquire voltage information indicating the primary side voltage magnitude;
store a reference profile representing a relationship between the primary side voltage magnitude and the changeover reference voltage; and
set the changeover reference voltage based on the acquired voltage information and the reference profile.

8. The power conversion apparatus according to claim 7, further comprising a voltage sensor configured to detect a primary side voltage value,
wherein the control circuitry is further configured to acquire the voltage information according to the primary side voltage value detected by the voltage sensor.

9. The power conversion apparatus according to claim 8, wherein the control circuitry is further configured to:
evaluate the primary side voltage magnitude based on a plurality of primary side voltage values repeatedly detected by the voltage sensor over a predetermined period of time; and
acquire the voltage information based on an evaluation result of the primary side voltage magnitude.

10. The power conversion apparatus according to claim 7, wherein the control circuitry is further configured to:
repeatedly acquire the voltage information after the changeover reference voltage is set;
evaluate a variation in the primary side voltage magnitude according to the voltage information repeatedly acquired; and
change the changeover reference voltage in response to determining that an evaluation result of the variation in the primary side voltage magnitude exceeds a predetermined level.

11. The power conversion apparatus according to claim 1, wherein the primary side electric power is an alternating-current power, and the control circuitry is further configured to set the changeover reference voltage at a voltage less than a peak value of a primary side voltage.

12. The power conversion apparatus according to claim 11, wherein the matrix converter circuitry is further configured to convert the primary side electric power passing through a filter into the secondary side electric power,
wherein the rectifier circuitry is configured to receive the primary side electric power that has passed through the filter, and
wherein the control circuitry is further configured to set the changeover reference voltage based on at least one parameter representing an electrical characteristic of the rectifier circuitry, at least one parameter representing an electrical characteristic of the filter, the primary side voltage magnitude, and an allowable current of the rectifier circuitry.

13. The power conversion apparatus according to claim 12, wherein the control circuitry is further configured to set the changeover reference voltage so that current flowing through the rectifier circuitry is equal to or less than the allowable current even when the terminal voltage of the capacitor changes from the changeover reference voltage to a voltage corresponding to the peak value of the primary side voltage in a step-like manner in the second connection state.

14. The power conversion apparatus according to claim 1, wherein the current limit device comprises a resistor, wherein the control circuitry comprises a changeover switch located on the second route and is configured to select the first connection state or the second connection state by the changeover switch.

15. The power conversion apparatus according to claim 1, wherein the control circuitry of the matrix converter circuitry is powered by direct-current power generated by the rectifier circuitry and the capacitor.

16. The power conversion apparatus according to claim 1, further comprising a second rectifier circuitry configured to convert the secondary side electric power to charge the capacitor.

17. The power conversion apparatus according to claim 1, further comprising a discharge switch configured to discharge power stored in the capacitor when the terminal voltage of the capacitor is larger than a discharge reference voltage.

18. The power conversion apparatus according to claim 17, wherein the discharge reference voltage is larger than the changeover reference voltage.

19. A power conversion method comprising:
- performing bidirectional power conversion between a primary side electric power associated with a primary side voltage magnitude and a secondary side electric power;
- converting, by a rectifier circuitry, the primary side electric power to charge a capacitor having a terminal voltage;
- setting a changeover reference voltage at a first reference voltage when the primary side voltage magnitude is a first voltage magnitude and set the changeover reference voltage at a second reference voltage which is different from the first reference voltage when the primary side voltage magnitude is a second voltage magnitude which is different from the first voltage magnitude; and
- selecting, based on a comparison between the changeover reference voltage and the terminal voltage, a connection state of the bidirectional power conversion from:
  - a first connection state in which the rectifier circuitry is connected to the capacitor by a first route including a current limit device; and
  - a second connection state in which the rectifier circuitry is connected to the capacitor by a second route that bypasses the current limit device.

20. A non-transitory memory device having instructions stored thereon that, in response to execution by a processing device, cause the processing device to perform operations comprising:
- performing bidirectional power conversion between a primary side electric power associated with a primary side voltage magnitude and a secondary side electric power;
- converting, by a rectifier circuitry, the primary side electric power to charge a capacitor having a terminal voltage;
- setting a changeover reference voltage at a first reference voltage when the primary side voltage magnitude is a first voltage magnitude and set the changeover reference voltage at a second reference voltage which is different from the first reference voltage when the primary side voltage magnitude is a second voltage magnitude which is different from the first voltage magnitude; and
- selecting, based on a comparison between the changeover reference voltage and the terminal voltage, a connection state of the bidirectional power conversion from:
  - a first connection state in which the rectifier circuitry is connected to the capacitor by a first route including a current limit device; and
  - a second connection state in which the rectifier circuitry is connected to the capacitor by a second route that bypasses the current limit device.

* * * * *